(12) United States Patent
Maehata et al.

(10) Patent No.: US 7,702,252 B2
(45) Date of Patent: Apr. 20, 2010

(54) CONNECTOR AND IMAGE FORMING APPARATUS INCLUDING THE SAME

(75) Inventors: Yasuhiro Maehata, Kanagawa (JP); Kazuki Suzuki, Kanagawa (JP); Takayuki Niihara, Kanagawa (JP); Makoto Kikura, Kanagawa (JP); Tetsuji Nishikawa, Tokyo (JP); Masahiro Ishida, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 253 days.

(21) Appl. No.: 11/822,059

(22) Filed: Jul. 2, 2007

(65) Prior Publication Data

US 2008/0069635 A1    Mar. 20, 2008

(30) Foreign Application Priority Data

Jun. 30, 2006    (JP)    ............... 2006-181084

(51) Int. Cl.
    *G03G 15/00*    (2006.01)
(52) U.S. Cl. .................. 399/107; 399/90; 399/117; 399/119; 403/379.5
(58) Field of Classification Search .................. 399/117, 399/167, 90, 107; 464/182; 403/1, 378, 403/379.1, 379.3, 379.5
    See application file for complete search history.

(56) References Cited

U.S. PATENT DOCUMENTS

| | | | | |
|---|---|---|---|---|
| 3,806,267 A | * | 4/1974 | Vining, Jr. .................. | 403/362 |
| 4,344,700 A | * | 8/1982 | Kasama et al. ............... | 399/117 |
| 6,148,690 A | * | 11/2000 | Schander et al. .............. | 74/569 |
| 2001/0021320 A1 | * | 9/2001 | Murayama et al. .......... | 399/117 |
| 2005/0117934 A1 | * | 6/2005 | Murayama et al. .......... | 399/111 |
| 2005/0123319 A1 | * | 6/2005 | Mizoguchi .................. | 399/111 |

FOREIGN PATENT DOCUMENTS

| | | |
|---|---|---|
| JP | 3033872 | 11/1996 |
| JP | 2001-154564 | 6/2001 |
| JP | 2002-235838 | 8/2002 |
| JP | 2003-091208 | 3/2003 |
| JP | 2004-100942 | 4/2004 |
| JP | 2005-107413 | 4/2005 |
| JP | 2005-164947 | 6/2005 |

* cited by examiner

*Primary Examiner*—David M Gray
*Assistant Examiner*—Roy Yi
(74) *Attorney, Agent, or Firm*—Harness, Dickey & Pierce, P.L.C.

(57) ABSTRACT

A connector connects a rotatable body including an attachment hole and an engaging groove, and a shaft pressed into the attachment hole to integrally rotate. The connector includes at least one pin configured to fit in the engaging groove; and a screw having a head configured to be pressed against the rotatable body either directly or via another member. The at least one pin is fixed on the shaft and extends in a radial direction of the shaft to penetrate the shaft. The screw is screwed into a screw hole on an end face of the shaft and is tightened to press the at least one pin against a surface of the engaging groove.

13 Claims, 10 Drawing Sheets

CONNECTOR AND IMAGE FORMING
APPARATUS INCLUDING THE SAME

PRIORITY STATEMENT

This patent specification is based on Japanese patent application, No. JP2006-181084 filed on Jun. 30, 2006 in the Japan Patent Office, the entire contents of which are incorporated by reference herein.

FIELD

Example embodiments generally relate to a connector and an image forming apparatus including the connector, for example, to a connector for connecting a rotatable body and a shaft, and an image forming apparatus including the connector.

DISCUSSION OF THE BACKGROUND

In general, a rotatable body rotated by a motor via a shaft is used in various technical fields. The rotatable body and the shaft may be connected by a connector to integrally rotate without rumbling. In image forming apparatuses, rotatable bodies are used in driving mechanisms, for example, for a photoreceptor on which a toner image is formed, an intermediate transfer belt to which the toner image is transferred from the photoreceptor, etc.

Figure 1:
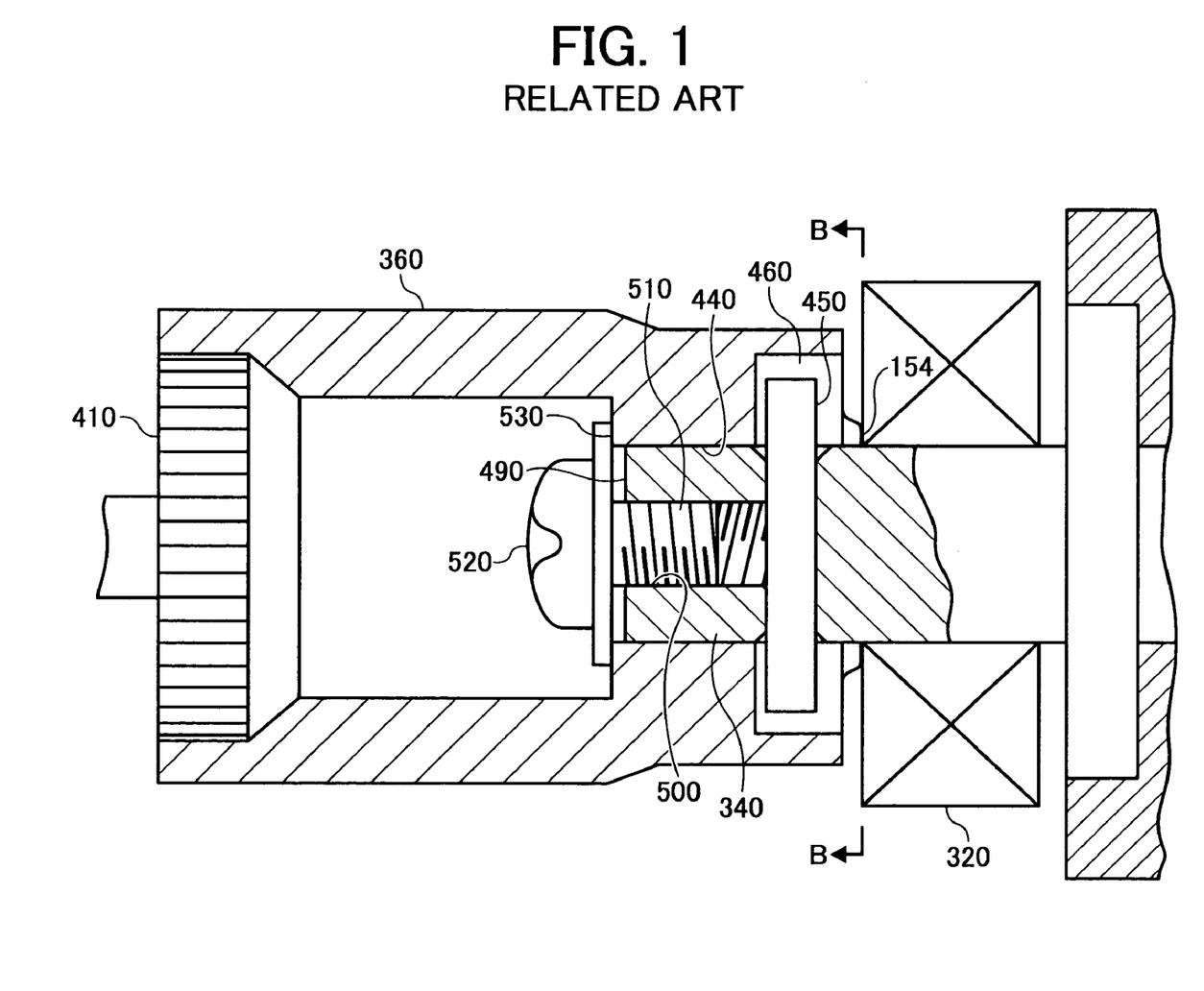
FIG. 1 is an illustration of a connector according to a related art.

FIG. 1 illustrates an example related art connector for connecting a shaft and a rotatable body. In FIG. 1, a joint 360 that is a rotatable body having an attachment hole 440 is connected to a shaft 340 fitted into the attachment hole 440 with a pin 450 fixed on the shaft 340 and a screw 510 including a head 520.

The pin 450 penetrates the shaft 340 and fits into an engaging groove 460 formed on the joint 360. The screw 510 is screwed into a screw hole 500 provided on an end face 490 of the shaft 340. A bearing 320 fits around the shaft 340. The joint 360 engages with a partner joint 410. The head 520 is pressed against an inner surface 530 of the joint 360. Accordingly, a surface 154 of the joint 360 facing the bearing 320 is pressed to the bearing 320.

Figure 2A:
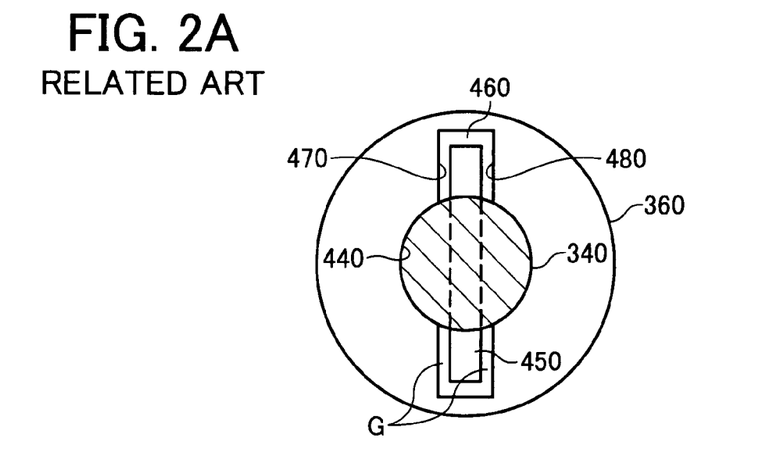
FIGS. 2A to 2C illustrate a cross-section of the connector of FIG. 1.

FIG. 2A illustrates a B-B cross-section of FIG. 1. As illustrated in FIG. 2A, the engaging groove 460 includes side surfaces 470 and 480. When the shaft 340 is pressed to fit the attachment hole 440 of the joint 360, tiny gaps G are required between the pin 450 and each of the side surfaces 470 and 480 of the engaging groove to fit the pin 450 into the engaging groove 460.

When the shaft 340 rotates in FIG. 1, a frictional force is generated between the surface 154 of the joint 360 and the surface of the bearing 320. Therefore, rumbling (relative rotation) of the joint 360 with respect to the shaft 340 is reduced. However, the rotation of the shaft 340 may not be transmitted to the joint 360 for a brief moment due to the gaps G. Therefore, the joint 360 may not rotate in an integrated manner.

For example, when a photoreceptor that is rotated in a direction and a reverse direction thereto is connected to the shaft 340 via the joint 360 and the partner joint 410, the rumbling may become a problem. When image forming is started and the shaft 340 rotates, the rotation is transmitted to the photoreceptor via the joint 360 and the partner joint 410. As a result, a significant external force is applied to the photoreceptor.

Figure 2B:
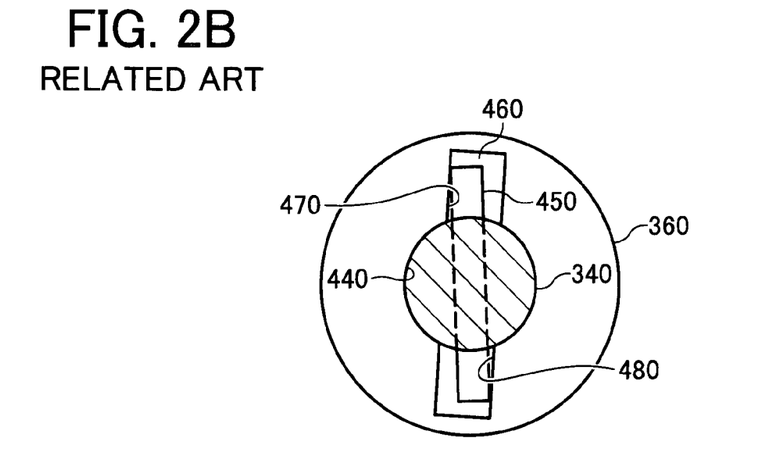

Therefore, the joint 360 rotates relatively to the shaft 340 pressed into the attachment hole 440 for a distance corresponding to the gap G as shown in FIG. 2B. A first end of the pin 450 presses the side surface 470 and a second end of the pin 450 presses the side surface 480. A toner image is formed on the photoreceptor in this state and transferred onto an intermediate transfer belt. If the photoreceptor is rotates in one direction only, the pin 450 stays at a similar position and the rumbling of the joint 360 may be insignificant.

Figure 2C:
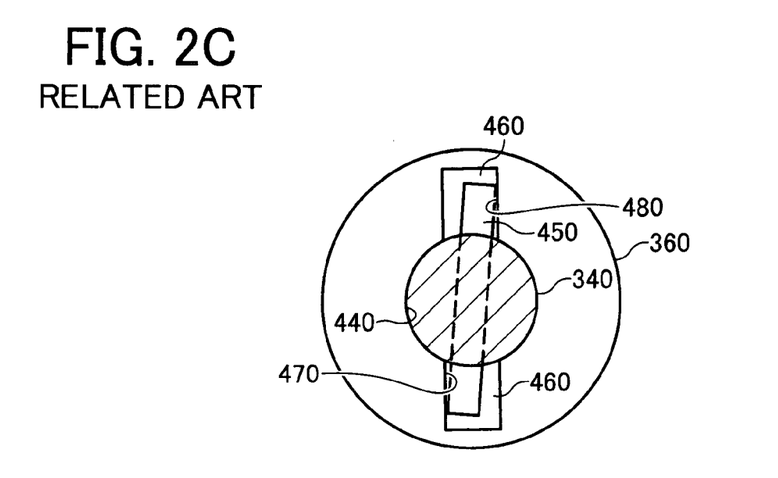

However, when the photoreceptor is reversely rotated, the joint 360 rotates relatively to the shaft 340 for a distance corresponding to the gaps G as shown in FIG. 2C. The first end of the pin 450 presses the side surface 480 and the second end of the pin 450 presses the side surface 470. As described above, rumbling of the joint 360 occurs because the rotation of the shaft 340 is not immediately transmitted to the joint 360 due to the gaps G.

If the image forming apparatus is tandem type and includes a plurality of photoreceptors, the photoreceptors may rotate at different moments relatively to the respective shafts 340. This may cause displacement of colors when the toner images on the photoreceptors are superimposed one on another on the intermediate transfer belt.

SUMMARY

In an example, a connector connects a rotatable body including an attachment hole and an engaging groove, and a shaft pressed into the attachment hole. The connector includes at least one pin configured to fit in the engaging groove; and a screw having a head configured to be pressed against the rotatable body either directly or via another member. The pin is fixed on the shaft and extends in a radial direction of the shaft to penetrate the shaft. The screw is screwed into a screw hole formed on an end face of the shaft and is tightened to press the at least one pin against a surface of the engaging groove. The rotatable body and the shaft may integrally rotate.

In an example, an image forming apparatus includes at least one process cartridge configured to form a toner image, the at least one process cartridge including a partner joint, a transferer configured to transfer the toner image onto a recording medium, the rotatable body, the shaft, and a connector connecting the rotatable body and the shaft. The partner joint is configured to detachably engage with the rotatable body.

Additional features and advantages of example embodiments will be more fully apparent from the following detailed description of example embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXAMPLE EMBODIMENTS

It will be understood that if an element or layer is referred to as being "on," "against," "connected to" or "coupled to" another element or layer, then it can be directly on, against, connected, or coupled to the other element or layer, or intervening elements or layers may be present. In contrast, if an element is referred to as being "directly on", "directly connected to" or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

It is to be understood that each specific element includes all technical equivalents that operate in a similar manner. Referring now to the drawings, wherein like reference numerals designate identical or corresponding parts throughout the several views, particularly to FIG. 3, an image forming apparatus 1 including a connector according to example embodiments is described.

Figure 3:
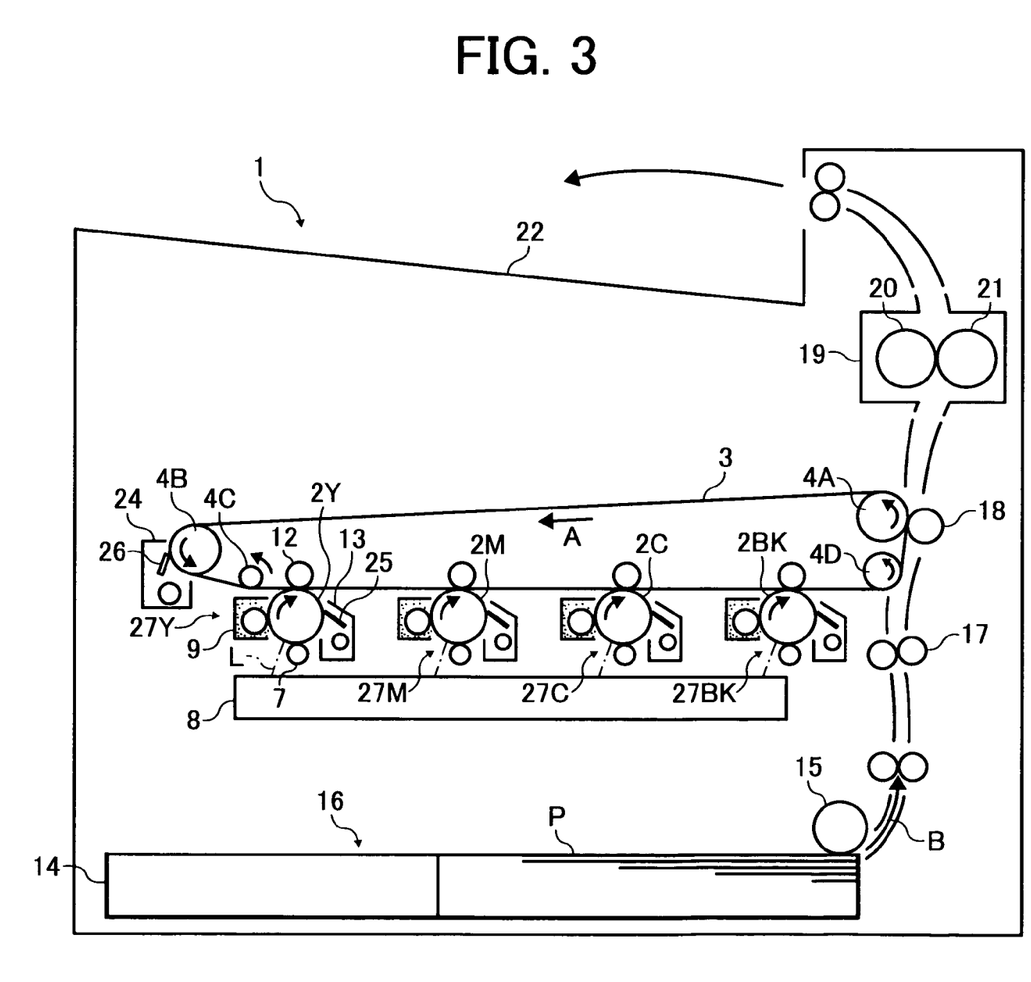
FIG. 3 is a schematic illustration of an example image forming apparatus.

As illustrated in FIG. 3, the image forming apparatus 1 may include four drum-shaped photoreceptors 2Y, 2M, 2C, and 2BK that are laterally arranged and an intermediate transfer belt 3 that is an endless belt. The intermediate transfer belt 3 may be stretched around a driving roller 4A and driven rollers 4B, 4C, and 4D.

The letters Y, M, C, and BK represents yellow, magenta, cyan, and black, respectively. The photoreceptors 2Y, 2M, 2C, and 2BK are respectively referred to as a first, a second, a third, and a fourth photoreceptor, as required and referred to as photoreceptors 2 when discrimination is not required.

The four photoreceptors 2Y, 2M, 2C, and 2BK may be driven to rotate clockwise in FIG. 3 while being in contact with the intermediate transfer belt 3. This rotation direction is referred to as a rotation direction during image forming. Around each of the photoreceptors 2Y, 2M, 2C, and 2BK, a charging roller 7, a developing unit 9, a primary transfer roller 12, and a cleaner 13 are provided. Each of the cleaners 13 may include a cleaning blade 25. Each of the primary transfer roller 12 is located at an opposite side of one of the photoreceptors 2Y, 2M, 2C, and 2BK with respect to the intermediate transfer belt 3.

In an example embodiment, the photoreceptor 2Y, the charging roller 7, the developing unit 9, and the cleaner 13 are integrated in a process cartridge 27Y that is attachable to and detachable from the image forming apparatus 1.

Similarly, one of the photoreceptors 2M, 2C, and 2BK and one of the charging rollers 7, one of the developing units 9, and one of the cleaners 13 are integrated in one of process cartridges 27M, 27C, and 27BK that are attachable to and detachable from the image forming apparatus 1. Each of the process cartridges 27Y, 27M, 27C, and 27BK is referred to as a process cartridge 27 when discrimination is not required.

The first photoreceptor 2Y is charged by the charging roller 7 to a predetermined or desirable polarity. The optical unit 8 applies an optically modulated laser beam L to the charged surface of the photoreceptor 2Y. Thus, an electrostatic latent image is formed thereon. The developing unit 9 develops the electrostatic latent image into a yellow toner image. When a transfer voltage is applied to the primary transfer roller 12 corresponding to the photoreceptor 2Y, the toner image on the photoreceptor 2Y is transferred onto the intermediate transfer belt 3 that is rotated in a direction of arrow A in a primary transfer process. This direction is hereinafter referred to as a belt rotation direction.

The cleaning blade 25 in the cleaner 13 removes toner remaining on the photoreceptor 2Y after the primary transfer process. The cleaning blade 25 is pressed against the surface of the photoreceptor 2Y in a counter direction with respect to the rotation direction of the photoreceptor 2Y.

Similarly, a magenta toner image, a cyan toner image, and a black toner image are formed on the second photoreceptor 2M, the third photoreceptor 2C, and the fourth photoreceptor 2BK, respectively. The magenta toner image, the cyan toner image, and the black toner image are transferred and superimposed one on another on the yellow toner image on the intermediate transfer belt 3. Thus, a superimposed image (full color image) is formed on the intermediate transfer belt 3.

The image forming apparatus 1 may further include a sheet feeder 16 having a sheet cassette 14 and a sheet feeding roller 15 in a lower section thereof. The sheet cassette 14 contains sheets of a recording medium (e.g., transfer paper, resin film, etc). When the sheet feeding roller 15 rotates, a sheet P in the sheet cassette 14 is forwarded from the top in a direction of arrow B.

The image forming apparatus 1 may further include a pair of registration rollers 17, a secondary transfer roller 18, and a fixer 19 along a sheet transport path from the sheet feeding roller 15 to a sheet ejection section 22. The secondary transfer roller 18 may be located at a position facing the driving roller 4A via the intermediate transfer belt 3. The fixer 19 may include a fixing roller 20 and a pressing roller 21. The image forming apparatus 1 may further include a cleaner 24 for cleaning the intermediate transfer belt 3. The cleaner 24 includes a cleaning blade 26 that is pressed against the surface of the intermediate transfer belt 3 in a counter direction with respect to the belt rotation direction shown by arrow A.

The registration rollers 17 rotate timely to send the sheet P between the intermediate transfer belt 3 and the secondary transfer roller 18. When a predetermined or desirable transfer voltage is applied to the secondary transfer roller 18, the superimposed toner image is transferred from the intermediate transfer belt 3 onto the sheet P in a secondary transfer process.

After the superimposed toner image is transferred thereon, the sheet P is further transported upward. While the sheet P passes between the fixing roller 20 and the pressing roller 21 in the fixer 19, the toner image is fixed thereon with heat and pressure. After passing through the fixer 19, the sheet P is ejected to the ejection section 22. The cleaning blade 26 removes toner remaining on the intermediate transfer belt 3.

After image forming is performed as above, a rotation of the photoreceptors 2 and the intermediate transfer belt 3 is stopped. However, if the photoreceptor 2 stops with an edge of the cleaning blade 25 being pressed against the photoreceptor 2, the cleaning blade 25 keeps pressing the surface of the intermediate transfer belt 3 with some force during a period when the image forming apparatus 1 is not operating. In such a case, the useful life of the photoreceptors 2 may be shortened. Likewise, if the intermediate transfer belt 3 stops with the cleaning blade 26 pressing the surface of the intermediate transfer belt 3 with some force, the useful life of the intermediate transfer belt 3 may be shortened.

Therefore, in an example embodiment, the image forming apparatus 1 is configured as follows. After the superimposed toner image is transferred onto the sheet P in the secondary transfer process, the photoreceptors 2 and the intermediate transfer belt 3 are slightly rotated, for example, for a distance of 2 mm, in reverse directions to the rotation directions during image forming. Therefore, the pressure of the cleaning blades 25 on the surfaces of the photoreceptors 2 are reduced and the pressure of the cleaning blade 26 to the surface of the intermediate transfer belt 3 is reduced. Because the image forming apparatus 1 stops in the above state, adverse affects on the useful life of the photoreceptors 2 and the intermediate transfer belt 3 may be prevented or reduced.

Figure 4:
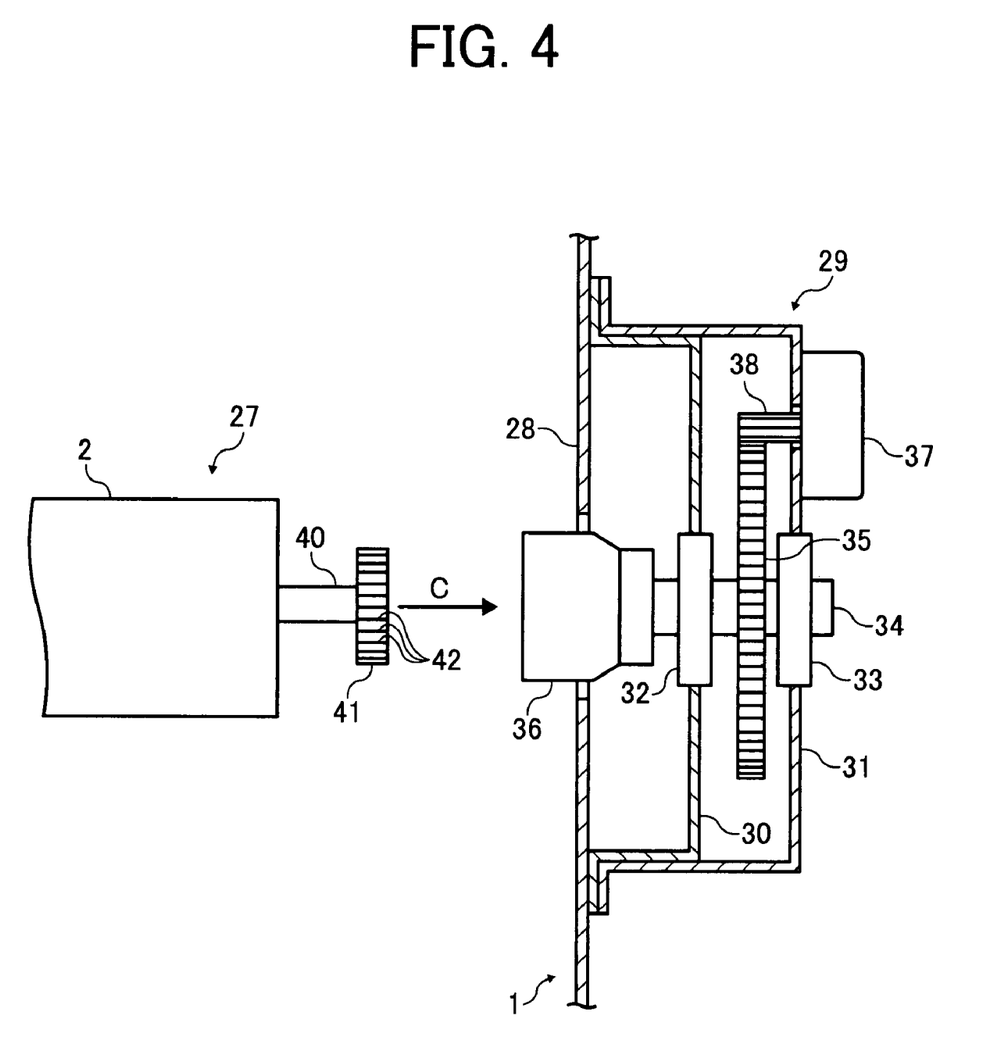
FIG. 4 is a plane view of an example driving unit for driving a photoreceptor.

FIG. 4 is an illustration to explain how to attach the process cartridge 27 to the image forming apparatus 1. The image forming apparatus 1 further includes a back plate 28, and a driving unit 29 attached to the back plate 28, and a joint 36 that is a rotatable body. The driving unit 29 may include support plates 30 and 31 detachably attached to the back plate 28, bearings 32 and 33, a shaft 34, and a gear 35. The shaft 34 is rotatably held by the support plates 30 and 31 via the bearings 32 and 33, respectively. For example, the shaft 34 includes a metal. The gear 35 includes a resin and is secured to the shaft 34 not to go slack. For example, the bearings 32 and 33 are ball bearings. In FIG. 4, the bearings 32 and 33 are simplified. The joint 36 is attached on the shaft 34.

The driving unit 29 further includes a motor 37 that may be provided on the support plate 31. The motor 37 rotates the photoreceptors 2 in both direction of the rotation direction during image forming and the reverse direction thereto. The motor 37 includes an output gear 38 that engages with the gear 35. The process cartridge 27 includes a photoreceptor axis 40 fixed inside the photoreceptor 2, and a partner joint 41 that detachably engages with the joint 36. The partner joint 41 includes a plurality of teeth 42 on an outer circumference thereof and is fixed on the photoreceptor axis 40 not to go slack. The process cartridge 27 is pushed in a direction of arrow C into the image forming apparatus 1.

The driving unit 29 may be used for driving the intermediate transfer belt 3 (in FIG. 3). In such a case, the partner joint 41 is attached to an axis of the driving roller 4A, instead of the photoreceptor axis 40. The rotation of the motor 37 is transmitted to the driving roller 4A via the shaft 34, the joint 36, the partner joint 41, and the axis of the driving roller 29. The motor 37 rotates the intermediate transfer belt 3 in both direction of the rotation direction during image forming and the reverse direction thereto.

Figure 5:
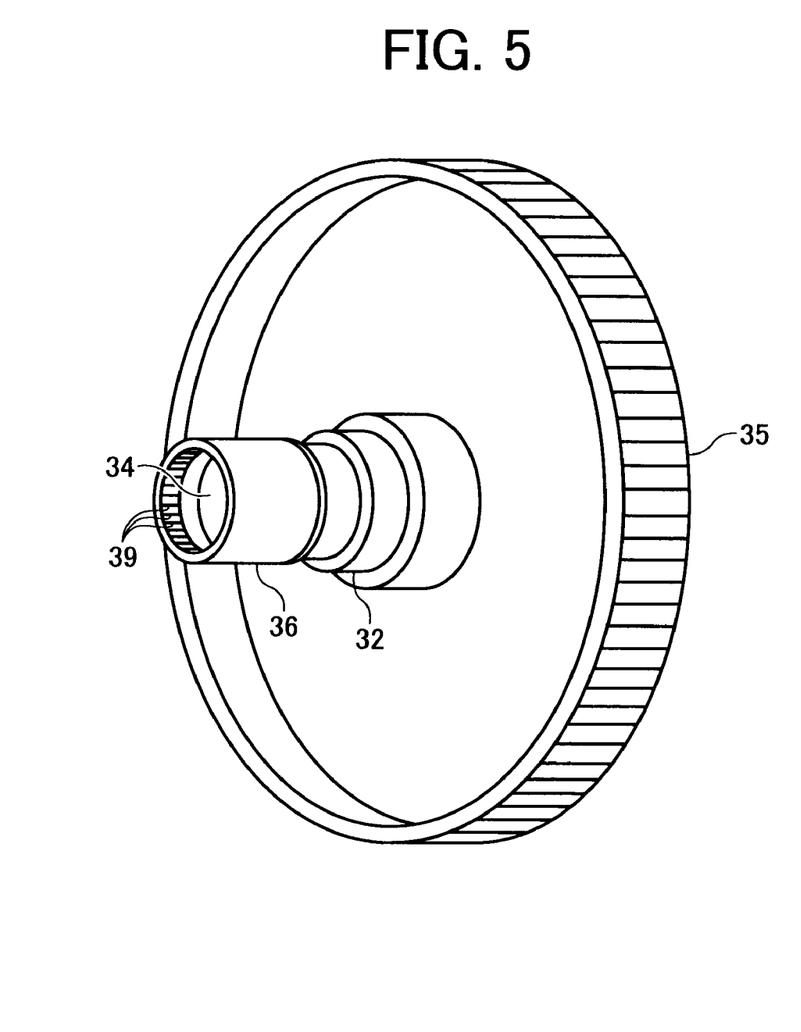
FIG. 5 is an example perspective view of a gear and a joint that are fixed on a shaft included in the driving unit.

FIG. 5 illustrates the gear 35, the bearing 32, and the joint 36 that are fixed on the shaft 34. As illustrated in FIG. 5, a plurality of teeth 39 are provided on an inner circumference of the joint 36.

When the process cartridge 27 is pushed into the image forming apparatus in FIG. 4, the teeth 39 (FIG. 5) of the joint 36 engage with the teeth 42 of the partner joint 41. Thus, the partner joint 41 fixed on the photoreceptor axis 40 engages with the joint 36 attached on the shaft 34 of the driving unit 29.

Referring to FIG. 4, when the motor 37 starts in the above state, the rotation of the motor 37 is transmitted to the photoreceptor 2 via the output gear 38, the gear 35, the shaft 34, the joint 36, the partner joint 41, and the photoreceptor axis 40. Thus, the photoreceptor 2 is rotated and a toner image is formed. After the superimposed toner image is transferred onto the sheet P from the photoreceptor 2, the motor 37 is reversed for a short time. The rotation of the motor 37 is transmitted to the photoreceptor 2 as described above, which rotates the photoreceptor 2 in a reverse direction to the rotation direction during image forming.

Figure 6:
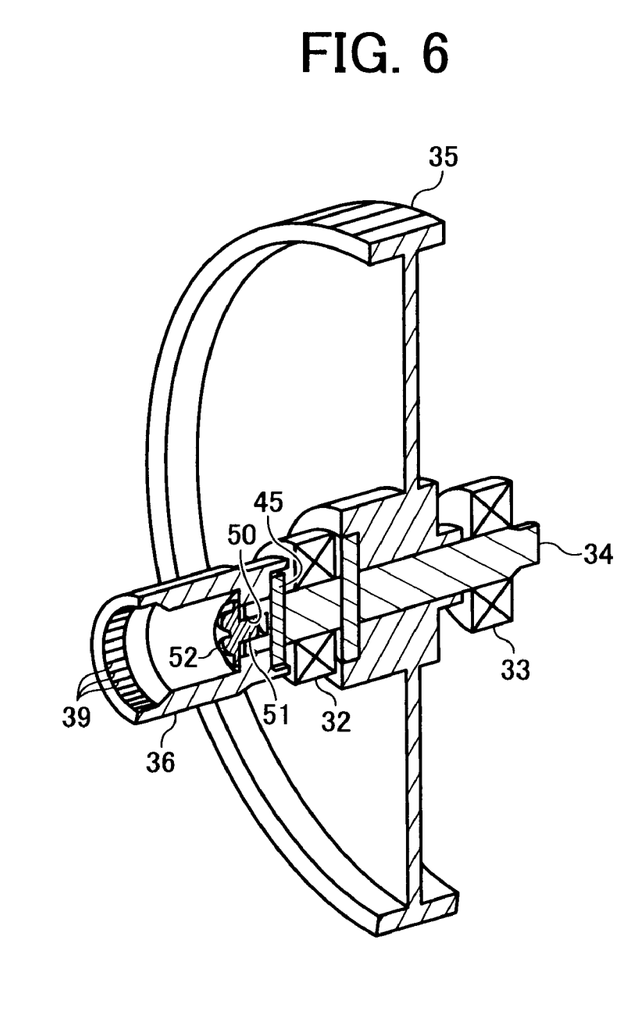
FIG. 6 illustrates a cross-section of a perspective view of the joint and the shaft connected by a connector according to an example embodiment.

A connector for connecting the shaft 34 and the joint 36 is described. As illustrated in FIG. 6, a screw hole 50 is formed on a shaft 34. The connector may include a screw 51 fixed into the screw hole 50 and a pin 45. The screw 51 includes a head 52.

Figure 7:
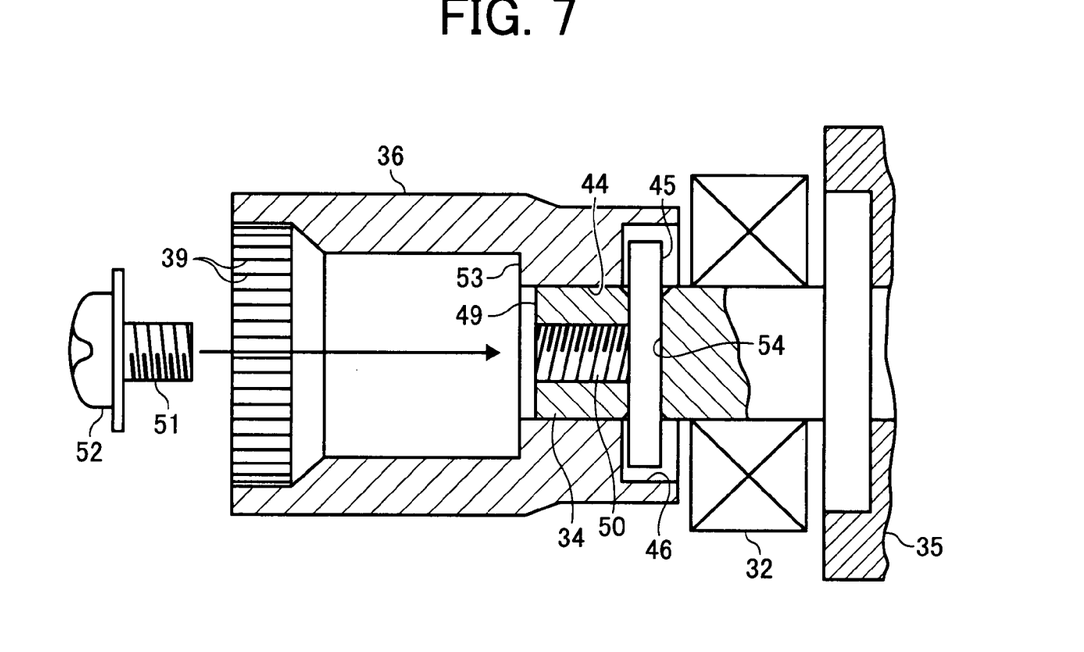
FIG. 7 is an example cross-section of the shaft and the joint before a screw is screwed into a screw hole on the shaft.

FIG. 7 illustrates a state before the screw 51 is fixed into the screw hole 50. The joint 36 includes an attachment hole 44 and an engaging groove 46. A pin hole 54 is formed in the shaft 34. The screw hole 50 is formed on an end face 49 of the shaft 34. The shaft 34 is pressed into the attachment hole 44 to fit thereto. The pin 45 extends substantially in a radial direction of the shaft 34 and is forcibly inserted into the pin hole 54 to penetrate the shaft 34. The pin 45 fits in the engaging groove 46. A female screw is formed inside the screw hole 50. The screw 51 is inserted in a direction shown by an arrow and pressed against an inner surface 53 of the joint 36.

Figure 8:
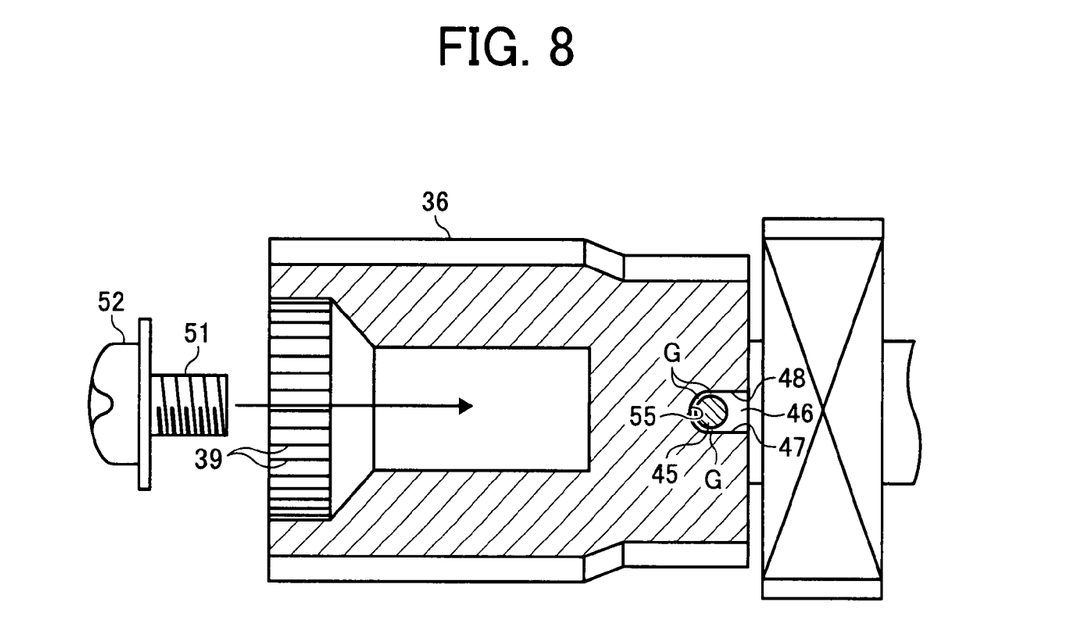
FIG. 8 is an example cross-section of the shaft and the joint before the screw is screwed into the screw hole on the shaft.

FIG. 8 illustrates the state of FIG. 7 from a viewpoint turned 90 degrees from a viewpoint of FIG. 7. The engaging groove 46 includes side surfaces 47 and 48, and a bottom surface 55. Gaps G are formed between the pin 45 and each of the side surfaces 47 and 48 and the bottom surface 55.

Figure 9:
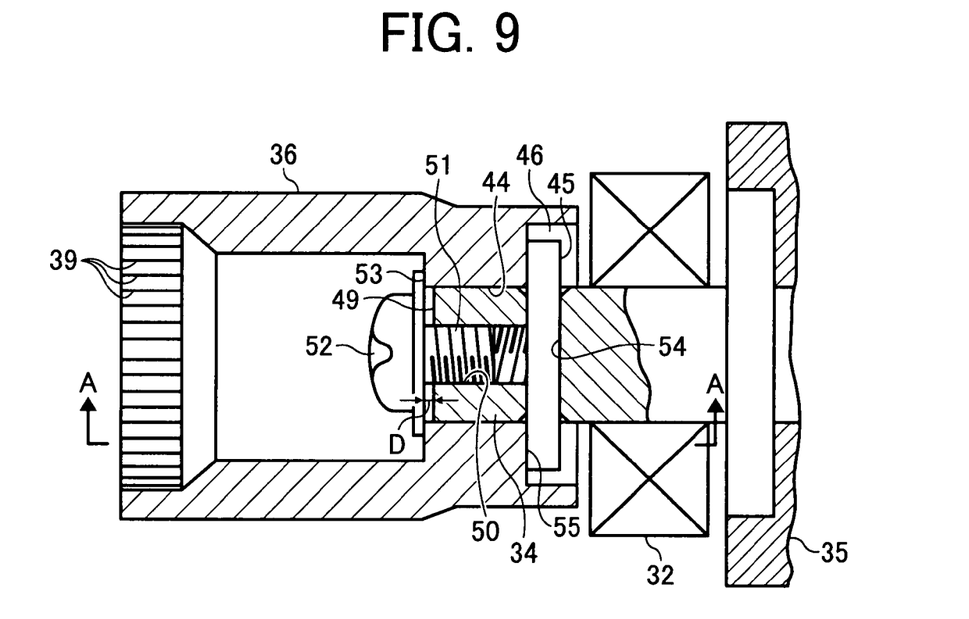
FIG. 9 illustrates an example cross-section of the joint and the shaft connected by the connector.

In FIG. 9, the screw 51 is screwed into the screw hole 50. The end face 49 of the shaft 34 and the inner surface 53 of the joint 36 may be configured to form a step. Because of the step, a gap D is formed in an axial direction of the shaft 34 between the end face 49 and the head 520.

Figure 10:
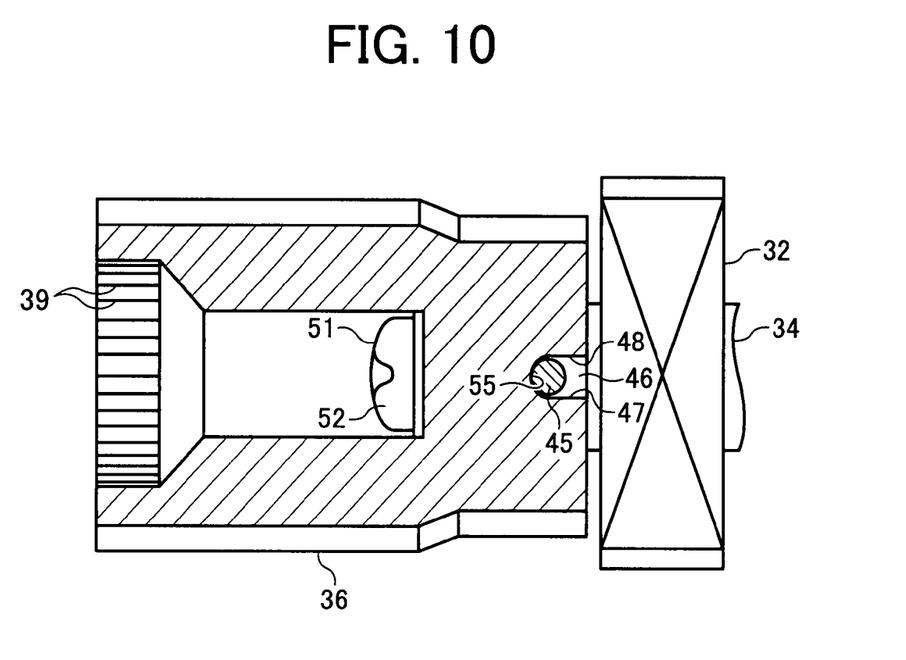
FIG. 10 illustrates an example cross-section of the joint and the shaft connected by the connector.

When the screw 51 is tightened, the head 52 of the screw 51 is pressed against the inner surface 53 of the joint 36. However, the joint 36 does not press the bearing 32. Therefore, a portion of the joint 36 sandwiched between the inner surface 53 and the pin 45 is compressed and the pin 45 is strongly pressed against the bottom surface 55 of the engaging groove 46 as illustrated in FIG. 10. FIG. 10 is A-A cross section diagram of FIG. 9. The engaging groove 46 is configured so that the pin 45 is pressed against the surface thereof when the screw 51 is tightened.

Therefore, the shaft 34 and the joint 36 may integrally rotate and the rotation of the shaft 34 is immediately transmitted to the photoreceptor 2 even when the shaft 34 reversely rotates. Further, all the photoreceptors 2 may rotate in better synchronization during image forming. Therefore, the displacement of colors in a superimposed toner image on the intermediate transfer belt 3 may be prevented or reduced. Further, a portion of the joint 36 sandwiched between an extended line of the end face 49 and the inner surface 53 may be significantly compressed by screwing the screw 51. Therefore, the pin 45 may be surely pressed against the surface of the engaging groove 46.

The screw 51 is taken out from the shaft 36 to detach the joint 36 from the shaft 34. Therefore, the joint 36 is exchangeable when the joint 36 is damaged, for example, by being strongly hit by the partner joint 41.

Figure 11:
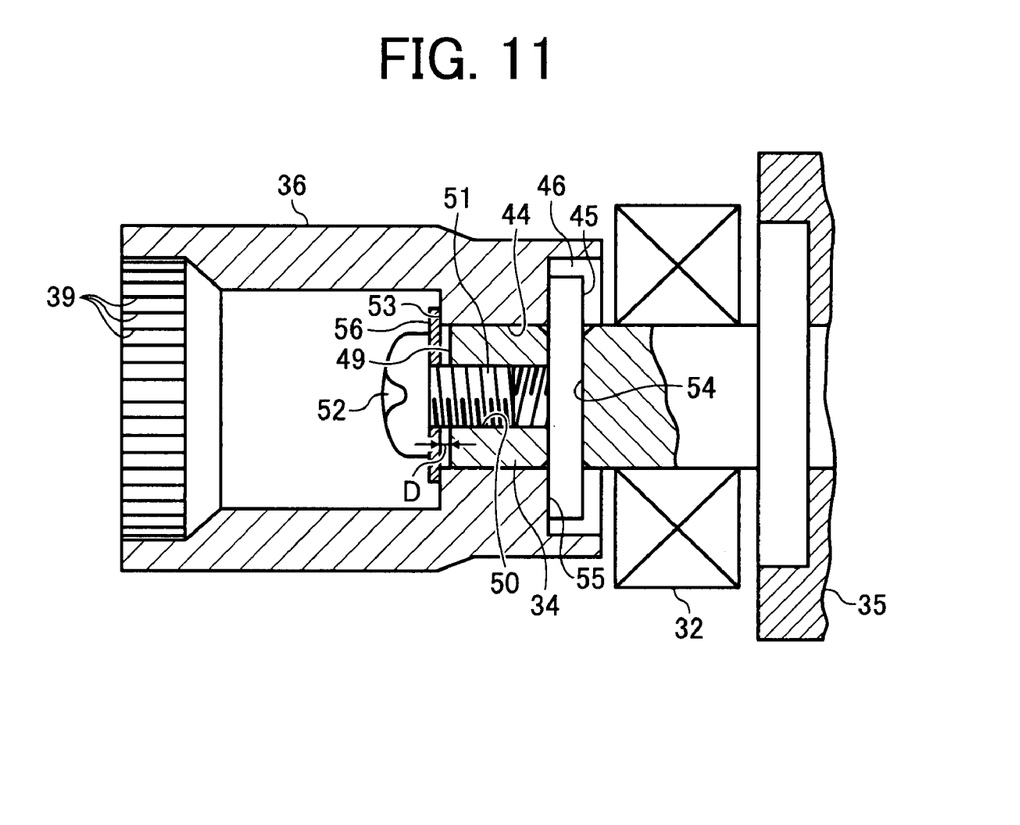
FIG. 11 illustrates an example in which a screw head is pressed against the joint via a washer.

The head 52 of the screw 51 may be pressed via another part to the inner surface 53 of the joint 36. In FIG. 11, the screw 51 is pressed via a washer 56 to the inner surface 53 of the joint 36. The gap D is formed in an axial direction of the shaft 34 between the end face 49 and the washer 56, similarly to FIG. 9.

The pin 45 may include a metal. The joint 36 may include a resin. When the pin 45 is relatively hard and the joint 36 is relatively elastic, the surface of the engaging groove against which the pin 45 is pressed may be more deformed. Because the pin 45 is buried deeper into the surface of the engaging groove 46, the rumbling of the joint 36 with respect to the shaft 34 may be better prevented or reduced.

Figure 12:
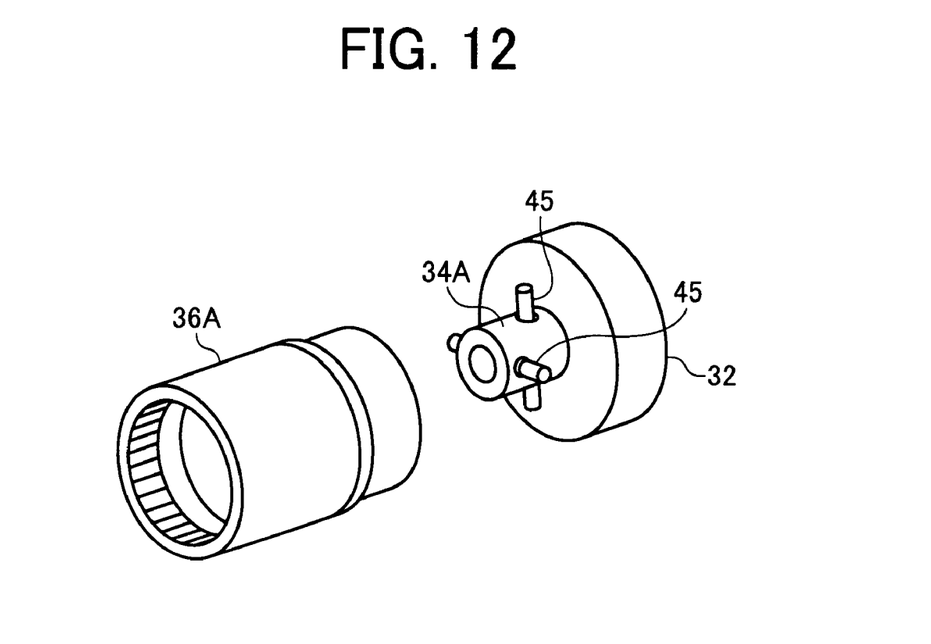
FIG. 12 illustrates an example in which a plurality of pins are fixed on the shaft.

FIG. 12 illustrates a shaft 34A and a joint 36A according to an example embodiment. The shaft 34A includes a plurality of pins 45 fixed thereto through press-fit processing. The joint 36A includes a plurality of engaging grooves corresponding to the pins 45. The pins 45 fit in the engaging grooves, respectively. In other respects, the joint 36A and the shaft 34A have similar configurations to the configurations of the joint 36 and the shaft 34 illustrated in FIGS. 7 to 10. The shaft 34A is attached to a support plate (not shown) via a bearing 32.

The plurality of engaging grooves may be configured so that the pins 45 are pressed against the surfaces of the engaging grooves, respectively, when the shaft 34A and the joint 36A are connected with a screw screwed into a screw hole of the shaft 34A.

Because the plurality of pins 45 are provided, contact pressures between each of the pin 45 and each of the engaging groove when the screw is tightened may be lower than the contact pressure between the pin 45 and the engaging groove 46 in FIG. 9 or 11. Therefore, the joint 36A may have a prolonged durability.

Further, when the pins 45 are arranged so as to have a substantially equal angle with adjacent pins in a circumference direction of the shaft 34A, each of the pins 45 contacts the surface of the corresponding engaging groove of the joint 36A with a substantially equal pressure. Therefore, the durability of the joint 36A may be enhanced because an excessively high pressure is not applied to one surface of the engaging groove. In FIG. 12, the pins 45 are arranged so as to have an angle of about 90 degrees with each other in the circumference direction.

Figure 13:
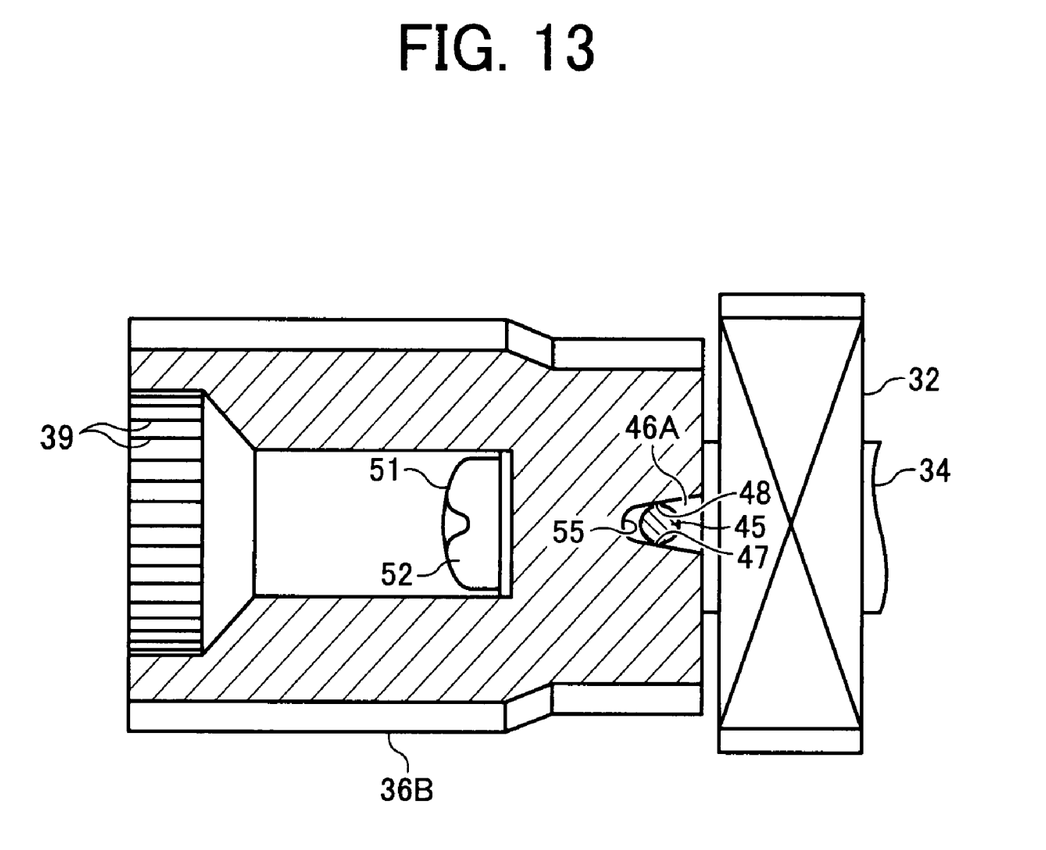
FIG. 13 illustrates an example in which an engaging groove has a shape similar to a letter V.

FIG. 13 illustrates a joint 36B according to an example embodiment. The joint 36B includes an engaging groove 46A having a shape similar to a letter V. The width of the engaging groove 46A is decreased toward a bottom surface 55. In other respects, the joint 36B is configured similarly to the joint 36 illustrated in FIGS. 7 to 10 and to be connected to a shaft 34 with a pin 45 and a screw 51. The shaft 34 is attached to a support plate (not shown) via a bearing 32.

The engaging groove 46A is configured so that the pin 45 is pressed against side surfaces 47 and 48 that face each other when the screw 51 is screwed into the shaft 34. Therefore, pressure per unit area between the pin 45 and each of the side surfaces 47 and 48 may be reduced, which may enhance the durability of the joint 36B.

Figure 14A:
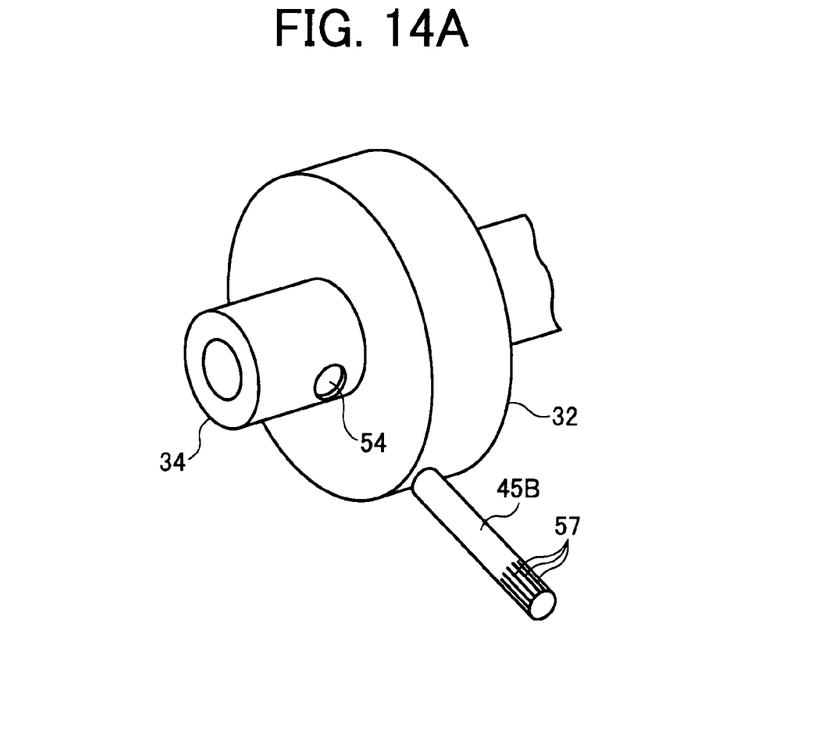
FIGS. 14A and 14B illustrate examples in which a concavo-convex pattern is formed on the pin.

As an example, a pin 45B having a concavo-convex portion 57 may be pressed to fit into a pin hole 54 of a shaft 34 as illustrated in FIG. 14A. The concavo-convex portion 57 is formed, for example, through knurling, on a portion of the pin 45B that is pressed against a surface of the engaging groove on the joint.

The pin 45B is inserted into the pin hole 54 from an end thereof on which the concavo-convex portion 57 is not formed. When the shaft 34 to which the pin 45B is fixed is connected to the joint 36 similarly to FIGS. 9 and 10, the concavo-convex portion 57 of the pin 45B is buried into the surface of the engaging groove 46. Therefore, the rumbling of the joint 36 with respect to the shaft 34 is better prevented or reduced.

In the example of FIG. 14A, the concavo-convex portion 57 is formed only at one end of the pin 45B in a longitudinal direction. If the concavo-convex portion 57 is formed on each end of the pin 45B in the longitudinal direction, or the pin 45B is inserted into the pin hole 54 from the end having the concavo-convex portion 57, the convexities of the concavo-convex portion 57 may strongly press against a circumferential surface of the pin hole 54 when the pin 45B is pressed thereto. As a result, the convexities may be chipped.

Figure 14B:
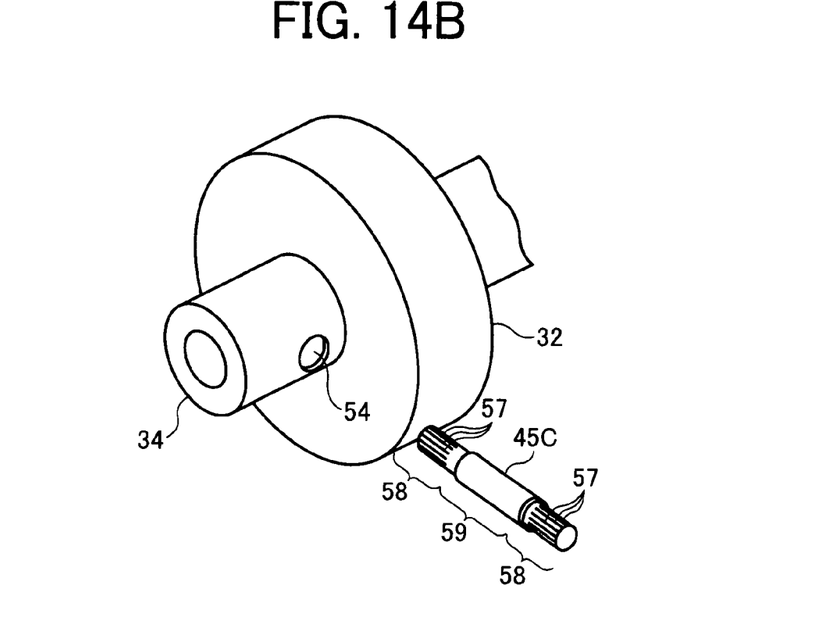

Therefore, when the concavo-convex portions 57 is formed on each end of the pin 45B, the diameter of the portion having the concavo-convex portion 57 may have a smaller diameter than the diameter of the center portion of the pin 45B as illustrated. In FIG. 14B, a pin 45C includes end portions 58 and a center portion 59. A concavo-convex portion 57 is formed on each of the end portions 58. Alternatively, the concavo-convex portion 57 is formed on one end of the pin 45C. The end portions 58 have a smaller diameter than a diameter of the center portion 59.

When the diameter of the end portion 58 is smaller than the diameter of the center portion 59, the convexities of the end portion 58 is not chipped when the pin 45C is pressed to fit into the pin hole 54. Therefore, the concavo-convexes portion 57 may be formed on both end portions 58. When the concavo-convex portion 57 is formed only on one end portion 58, the pin 45C may be inserted into the pin hole 54 from either end thereof.

As described above, in the image forming apparatus 1 (FIG. 3), the rotation of the motor 37 is transmitted to the photoreceptor 2 via the shaft 34, the joint 36, the partner joint 41, and the photoreceptor axis 40, as shown in FIG. 4. Further, the photoreceptor 2 is configured to be rotated by the motor 37 also in the direction reverse to the rotation direction during image forming. The connector according to an example embodiment is applicable to connect the shaft 34 for driving the photoreceptor 2 and the joint 36 into which the shaft 34 fits.

Further, the connector according to an embodiment is applicable to connect another shaft and a rotatable body into which the shaft fits. For example, the connector according to an embodiment is applicable to connect a shaft for driving the driving roller 4A supporting the intermediate transfer belt 3 and a joint into which the shaft fits. The driving roller 4A is configured to be rotated by the motor in the rotation direction during image forming and the reverse direction thereto.

What is claimed is:

1. A connector for connecting a rotatable body including an attachment hole and an engaging groove; and a shaft pressed into the attachment hole; the connector comprising:
    at least one pin fixed on the shaft and extending in a radial direction of the shaft to penetrate the shaft, configured to fit in the engaging groove; and
    a screw screwed into a screw hole on an end face of the shaft, including,
        a head configured to be pressed against the rotatable body either directly or via another member,
    wherein the screw is tightened to press the at least one pin against a surface of the engaging groove.

2. The connector according to claim 1, wherein a surface of the rotatable body and the end face of the shaft form a step in an axial direction of the shaft.

3. The connector according to claim 1, wherein the at least one pin comprises a metal and the rotatable body comprises a resin.

4. The connector according to claim 1, wherein the at least one pin comprises a plurality of pins.

5. The connector according to claim 4, wherein the plurality of pins are arranged so as to have a substantially equal angle with adjacent pins in a circumference direction of the shaft.

6. The connector according to claim 1, wherein the at least one pin is pressed against side surfaces of the engaging groove facing each other when the screw is tightened.

7. The connector according to claim 1, wherein the at least one pin comprises a portion including concavities and convexities pressing against the engaging groove.

8. The connector according to claim 7, wherein the portion including concavities and convexities is formed on at least an end of the at least one pin in a longitudinal direction thereof and a diameter thereof is smaller than a diameter of other portions of the at least one pin.

9. An image forming apparatus, comprising:
    the rotatable body;
    the shaft;
    the connector according to claim 1 connecting the shaft and the joint;
    at least one process cartridge configured to form a toner image, the at least one process cartridge including,
        a partner joint configured to detachably engage with the rotatable body; and
    a transferer configured to transfer the toner image onto a recording medium.

10. The image forming apparatus according to claim 9, wherein the at least one process cartridge includes
    at least one photoreceptor on which an electrostatic latent image is formed;
    a charger configured to charge the at least one photoreceptor; and
    an image developer configured to develop the electrostatic latent image with a toner to form a toner image on the at least one photoreceptor.

11. The image forming apparatus according to claim 10, further comprising:
    a motor configured to drive the at least one photoreceptor;
    wherein the partner joint is fixed on an axis of the at least one photoreceptor axis;
    wherein the rotatable body is a joint configured to detachably engage with the partner joint, and
    wherein the motor rotates the shaft, the joint, the partner joint, and the axis of the at least one photoreceptor to rotate the at least one photoreceptor in a rotation direction during image forming and a reverse direction thereto.

12. An image forming apparatus, comprising:
    at least one process cartridge including at least one photoreceptor on which a toner image is formed;
    an intermediate transfer belt configured to receive the toner image from the at least one photoreceptor;
    a driving roller configured to rotate the intermediate transfer belt; a motor configured to drive the driving roller;
    the rotatable body;
    the shaft;
    the connector according to claim 1 connecting the shaft and the joint; and
    a partner joint fixed on an axis of the driving roller,
    wherein the rotatable body is a joint configured to detachably engage with the partner joint, and
    wherein the motor rotates the shaft, the joint, the partner joint, and the axis of the roller to rotate the driving roller in a rotation direction during image forming and a reverse direction thereto.

13. The connector according to claim 1, wherein the rotatable body is configured to be compressed by the head and the pin fitted into the engaging groove, the compression occurring in a direction substantially parallel to an axis of the shaft.

* * * * *